(12) United States Patent
Battle et al.

(10) Patent No.: US 11,847,196 B2
(45) Date of Patent: Dec. 19, 2023

(54) DEVICE, USER, OR SERVER REGISTRATION AND VERIFICATION

(71) Applicant: 3M INNOVATIVE PROPERTIES COMPANY, St. Paul, MN (US)

(72) Inventors: Karl Battle, Woodbury, MN (US); Momodou L. Jaiteh, Woodbury, MN (US); Mark A. Learned, Crystal, MN (US); Eric Y. Ong, St. Anthony, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 402 days.

(21) Appl. No.: 17/309,025

(22) PCT Filed: Oct. 18, 2019

(86) PCT No.: PCT/IB2019/058927
§ 371 (c)(1),
(2) Date: Apr. 15, 2021

(87) PCT Pub. No.: WO2020/089724
PCT Pub. Date: May 7, 2020

(65) Prior Publication Data
US 2022/0012318 A1    Jan. 13, 2022

Related U.S. Application Data

(60) Provisional application No. 62/754,251, filed on Nov. 1, 2018.

(51) Int. Cl.
*G06F 21/00* (2013.01)
*G06F 21/32* (2013.01)

(52) U.S. Cl.
CPC .................................. *G06F 21/32* (2013.01)

(58) Field of Classification Search
None
See application file for complete search history.

(56) References Cited

U.S. PATENT DOCUMENTS 9,338,156 B2 *  5/2016  Oberheide .......... H04W 12/068
9,832,019 B2   11/2017  Choi
(Continued)

FOREIGN PATENT DOCUMENTS

CN      101860978      5/2012
CN      106850611      4/2020
(Continued)

OTHER PUBLICATIONS

Abd Jalil, Kamarularifin; Rahman, Qatrunnada Binti Abdul. Multiple trusted devices authentication protocol for ubiquitous computing applications. 2012 International Conference on Cyber Security, Cyber Warfare and Digital Forensic. https://ieeexplore.ieee.org/stamp/stamp.jsp?tp=&arnumber=6246093 (Year: 2012).*
(Continued)

*Primary Examiner* — Jeremiah L Avery
(74) *Attorney, Agent, or Firm* — Sriram Srinivasan (57) ABSTRACT

The present disclosure provides systems, devices, methods, and computer-readable media for user, device, or server authentication. A device can include processing circuitry to perform operations comprising generating, by a transducer, biometric data of the user in response to detection of the user performing a non-authentication operation with the device, providing the biometric data to an authentication server for user verification, wherein the authentication server is registered with and verified by the device and the device is registered with and verified by the authentication server, permitting the user access to functionality of the device in response to a results communication from the authentication server indicating the user verification passed, and denying the user access to functionality of the device in response to (Continued)

the results communication from the authentication server indicating that the user verification failed.

15 Claims, 5 Drawing Sheets

(56) References Cited

U.S. PATENT DOCUMENTS

| | | | |
|---|---|---|---|
| 10,084,761 B1* | 9/2018 | Howell | H04L 63/061 |
| 2014/0195815 A1 | 7/2014 | Taveau et al. | |
| 2015/0326570 A1 | 11/2015 | Publicover | |
| 2016/0073252 A1 | 3/2016 | Spencer | |
| 2016/0099938 A1 | 4/2016 | Seo | |
| 2016/0142407 A1 | 5/2016 | Chun | |
| 2016/0277439 A1 | 9/2016 | Rotter et al. | |
| 2016/0330178 A1 | 11/2016 | Sprague | |
| 2017/0272316 A1* | 9/2017 | Johnson | H04L 61/301 |
| 2017/0295173 A1 | 10/2017 | Walsh | |
| 2017/0346815 A1* | 11/2017 | Andrews | H04L 9/3231 |
| 2017/0346851 A1* | 11/2017 | Drake | H04L 9/0838 |
| 2018/0019994 A1 | 1/2018 | Chang | |
| 2018/0150687 A1* | 5/2018 | Nada | G06V 40/11 |
| 2018/0351739 A1* | 12/2018 | Ota | H04L 9/3231 |
| 2018/0351946 A1* | 12/2018 | Forest | H04W 12/06 |

FOREIGN PATENT DOCUMENTS

| | | |
|---|---|---|
| WO | WO 2015-102880 | 7/2015 |
| WO | 2018111858 A1 | 6/2018 |

OTHER PUBLICATIONS

Chennam, KrishnaKeerthi; Muddana, Lakshmi. Improving Privacy and Security with Fine Grained Access Control Policy using Two Stage Encryption with Partial Shuffling in Cloud. 2018 3rd IEEE International Conference on Recent Trends in Electronics, Information & Communication Technology. https://ieeexplore.ieee.org/stamp/stamp.jsp?tp=&arnumber=9012434 (Year: 2018).*

Tan, Zuowen. Secure Delegation-Based Authentication for Telecare Medicine Information Systems. IEEE Access, vol. 6. https://ieeexplore.ieee.org/stamp/stamp.jsp?tp=&arnumber=8353197 (Year: 2018).*

Extended European Search Report, EP19879847.2, dated Jun. 22, 2022, 4 pages.

International Search Report for PCT International Application No. PCT/IB2019/058927, dated Jan. 16, 2020, 2 pages.

* cited by examiner

DEVICE, USER, OR SERVER REGISTRATION AND VERIFICATION

CROSS REFERENCE TO RELATED APPLICATIONS

This application is a national stage filing under 35 U.S.C. § 371 of PCT/IB2019/058927, filed 18 Oct. 2019, which claims the benefit of Provisional U.S. Patent Application No. 62/754,251, filed 1 Nov. 2018, the entire disclosure of each of which is incorporated by reference in its entirety herein.

BACKGROUND

User and device authentication is becoming more and more challenging. Part of the challenge is that there are increasing numbers of devices of ever-increasing device types. Keeping track of all the devices, the users with permissions to access the devices, and keeping the devices safe from exploitation is increasingly difficult. Further, users are becoming increasingly frustrated by the myriad of authentication schemes required to access different devices. This frustration is compounded by the user using different passwords for different devices, even though such a variety in the passwords is recommended for security reasons.

SUMMARY OF THE DISCLOSURE

The present disclosure provides devices, systems, methods, and machine-readable media for device, user, or authentication server authentication. A device can include a memory, processing circuitry, including a transducer to generate biometric data of a user of the device, coupled to the memory, the processing circuitry to perform operations comprising generating, by the transducer, biometric data of the user in response to detection of the user performing a non-authentication operation with the device. The operations can further include providing the biometric data to an authentication server for user verification, wherein the authentication server is registered with and verified by the device and the device is registered with and verified by the authentication server. The operations can further include permitting the user access to functionality of the device in response to a results communication from the authentication server indicating the user verification passed. The operations can further include denying the user access to functionality of the device in response to the results communication from the authentication server indicating that the user verification failed.

A method can include registering a device with an authentication server including receiving or generating a device identification. The method can further include registering the authentication server with the device including receiving or generating an authentication server identification. The method can further include registering a user with the authentication server including receiving or generating a user identification. The method can further include, in response to detecting, by the device, the user has performed a specified action using the device, verifying, by communication between the device and the authentication server, at least two identities of (i) the device identification, (ii) the authentication server identification, (iii) the respective user identification, and (iv) that the respective user identification is associated with the device identification. The method can further include, in response to any of the at least two identities failing to verify, denying user action to functionality of the device. The method can further include, in response to all of the at least two identities being verified, permitting the user access to the functionality of the device.

A non-transitory machine-readable medium can include instructions that, when executed by a device, cause the device to perform operations comprising registering a device with an authentication server including receiving or generating a device identification, registering the authentication server with the device including receiving or generating an authentication server identification. The operations can further includes registering one or more users with the authentication server including receiving or generating a user identification. The operations can further include verifying, by communication with the authentication server, each of (i) the device identification, (ii) the authentication server identification, (iii) the user identification, and (iv) that the respective user identification is associated with the device identification. The operations can further include, in response to any of (i)-(iv) failing to verify, denying user action to functionality of the device. The operations can further include, in response to all of (i)-(iv) being verified, allowing the user access to the functionality of the device.

A system can include a device comprising a memory and device processing circuitry, including a transducer to generate biometric data of a user of the device, coupled to the memory, the device processing circuitry to perform first operations comprising generating, by the transducer, biometric data of the user in response to detection of the user performing a non-authentication operation with the device. The operations can further include providing the biometric data to an authentication server for user verification, wherein the authentication server is registered with and verified by the device and the device is registered with and verified by the authentication server. The operations can further include permitting the user access to functionality of the device in response to a results communication from the authentication server indicating the user verification passed. The operations can further include denying the user access to functionality of the device in response to the results communication from the authentication server indicating that the user verification failed. The authentication server can include a memory including authentication data stored thereon and authentication server processing circuitry to perform second operations comprising comparing the biometric data to second biometric data in the authentication data. The operations of the authentication server processing circuitry can further include providing a results communication indicating that (i) the verification passes if (a) the biometric data matches the second biometric data and (b) that the user is associated with the device in the authentication data, or (ii) that the verification fails if either (c) the biometric data does not match the second biometric data or (d) the user is not associated with the device in the authentication data.

The present disclosure further provides a device or system configured to perform the operations. The present disclosure further provides at least one machine-readable medium including instructions that, when executed by a machine, configure to the machine to perform the operations. The present disclosure further provides a method of performing the operations. The present disclosure further provides means for performing the operations.

There are various advantages to various embodiments of the present disclosure. For example, according to various embodiments, a user experience can be enhanced by seamless authentication. Another advantage can include enhancing security through user, device, or server registration or verification without user input. Another advantage can include enhancing security through strict adherence to registration or verification rules. Yet another advantage can include verifying a user identity independent of user input or a user intended initiation of user verification. Such embodiments can help reduce spoofing or other impersonation sorts of attacks.

BRIEF DESCRIPTION OF THE FIGURES

The drawings illustrate generally, by way of example, but not by way of limitation, various embodiments discussed in the present document.

DETAILED DESCRIPTION

Reference will now be made in detail to certain embodiments of the disclosed subject matter, examples of which are illustrated in part in the accompanying FIGS. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for description only and not of limitation. Any use of section headings is intended to aid reading of the document and is not to be interpreted as limiting; information that is relevant to a section heading may occur within or outside of that section.

In the methods described herein, the acts can be carried out in any order without departing from the principles of the disclosure, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range and includes the exact stated value or range. The terms "substantially" or "sufficiently" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

Various embodiments of the present disclosure provide a secure implementation of a mutual authentication server-to-local device identity verification. The embodiments can further provide a user authentication-to-authentication server or the local device. Embodiments can include one or more of the following features: (i) user registration with an authentication server or device, (ii) user authentication (e.g., using biometric data) with authentication server or device, (iii) device verification of authentication server identity, (iv) authentication server verification of device identity, (v) user association with the device at the authentication server, and (vi) identify a user intention to use or interact with the device to trigger biometric data collection or user authentication.

Embodiments provide a secure authentication of assets/devices in the cloud. Embodiments can maintain integrity and security of the assets. Embodiments can include a device/asset to seamlessly authenticate the user and reduce the chance of impersonation ("spoofing"). Currently, there is no way for devices (e.g., IoT devices or other internet-connected devices) to seamlessly and uniquely identify a user. Herein, seamlessly means the user is unaware of the identification process occurring. For example, a phone facial recognition authentication is not seamless. This is because a user is required to situate their face in a field of view of a camera of the phone to perform the authentication. Seamless authentication can include a device performing the identification in the natural use of the device. For example, consider a helmet with a visor. A helmet is to be worn on the head in natural use. Seamless authentication with a helmet can include facial recognition identification. In another example, consider a smartwatch. For natural use, the smartwatch is situated on a wrist of a user. Seamless authentication with the smartwatch can include verifying one or more unique biometric characteristics of the skin or body under the smartwatch, such as by using a wrist print or the like. In yet another example, consider a smartphone. For natural use, the smartphone is situated in a user's hand. Seamless authentication with the smartphone can include verifying one or more unique biometric characteristics of the palm, finger, or other potion of the user's hand.

Embodiments allow the user to seamlessly interact with the device while maintaining secure access to the device. The device can be mutually verified with the cloud (e.g., an authentication server in the cloud). Embodiments can thus provide seamless device authentication that allows the user to interact in an approved (permission-based) manner to verify device and user identity, such as in a "two-way verification", sometimes called a "handshake".

Consider the example in which a user has an IoT device like a smartwatch. The user can register the smartwatch with the cloud and the cloud can register with the smartwatch at the same or a different time. The user can authenticate to the cloud, such that the user is associated with the device. A subsequent connection attempt by the device to cloud can include a mutual verification of each (cloud and device) identity. After a connection between the device and the cloud is established, a user can authenticate to either the cloud (with device as conduit) or device. After the user is authenticated, the device then proceeds to, for example, collect data (e.g., biometric data of the user). The data can be sent to the cloud for processing. The whole authentication process can be transparent to the user after the initial registration. Then, when an unauthorized user (a user that is not registered to use the device or for which the cloud does not have biometric data) attempts to use the device, for example the smartwatch, the authentication will fail. Thus, the device will not allow data collection and/or processing to continue due to the user verification failing at the cloud.

Reference will now be made to the FIGS. to describe further details of embodiments.

Figure 1:
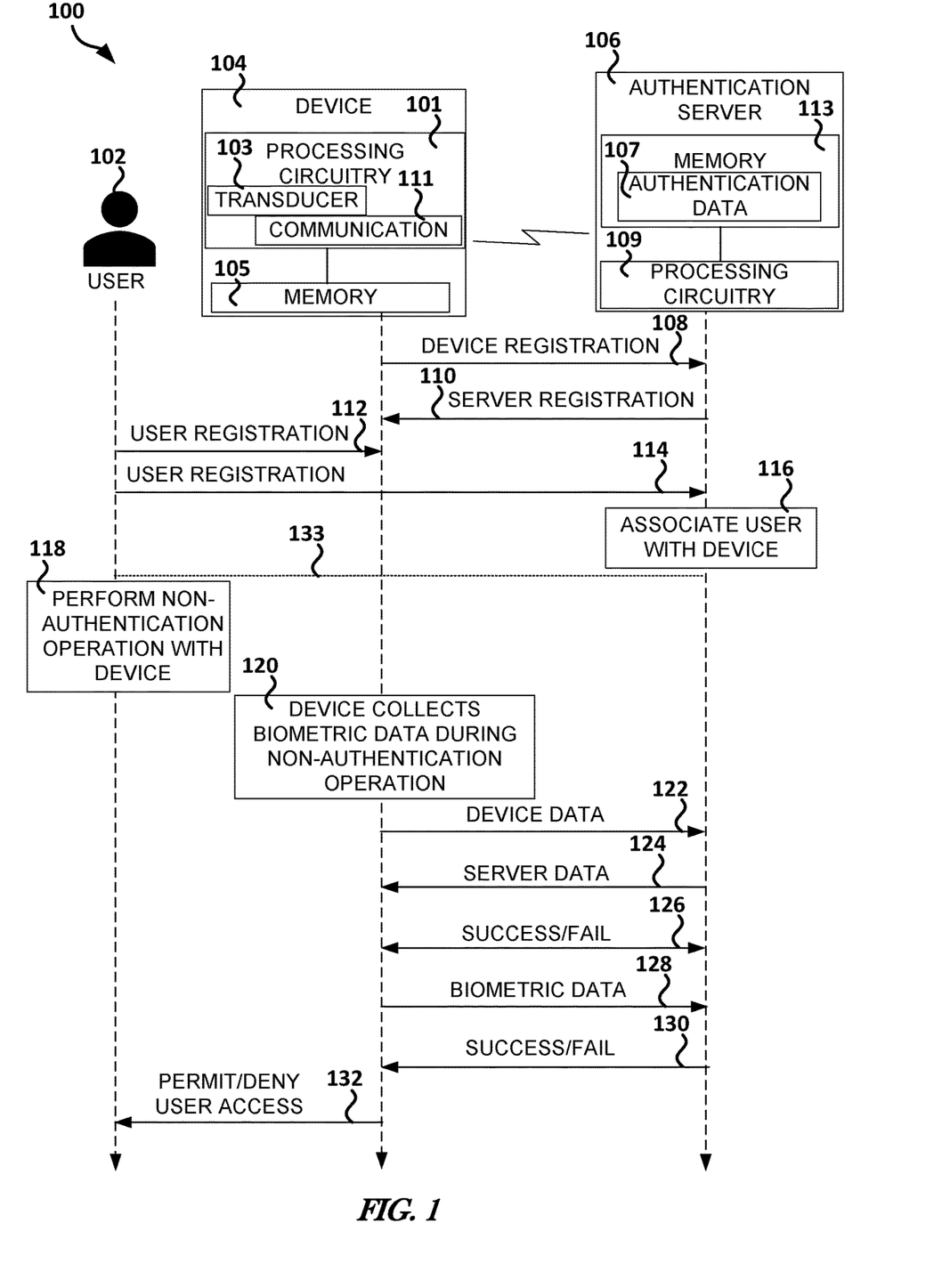
FIG. 1 illustrates, by way of example, a communication diagram of an embodiment of communications between items of a seamless authentication system.

FIG. 1 illustrates, by way of example, a communication diagram of an embodiment of communications between items of a seamless authentication system 100. The seamless authentication system 100 as illustrated includes a user 102, a device 104, and an authentication server 106. The user 102 includes any person capable of using the device 104.

The device 104 can include a computing device (e.g., a phone, laptop, tablet, desktop, smartwatch, fitness tracker, or the like), e-reader, helmet, appliance (e.g., stove, refrigerator, coffee maker, microwave, television, washer, dryer, dishwasher, or the like), security device (e.g., a camera, microphone, sensor, such as a motion detection sensor, glass break sensor, window or door opening sensor, smoke detector, heat detector, water detector, or the like), vehicle (e.g., a manned or unmanned car, truck, boat, airplane, or the like), a health monitor (e.g., a blood-glucose, pulse oximetry, oxygen tank, blood pressure, heart rate, heart beat monitor, pacemaker, or the like), or other device capable of being used by the user 102 and communicating with the authentication server 106.

The device 104 as illustrated includes processing circuitry 101 and a memory 105. The processing circuitry 101 as illustrated includes a transducer 103 and communication circuitry 111. The device 104 can communicate with the authentication server 106, such as through communication circuitry 111. The communication can be wired or wireless. The communication can be on a same or a different network. The communication can be over the Internet. The communication circuitry 111 can include one or more of a wired communication circuit or a wireless communication circuit. Examples of wired communication circuits include circuits that conform to an Ethernet, Recommended Standard 232 (RS-232), RS-485, Universal Asynchronous Receiver/Transmitter (UART), Universal Synchronous/Asynchronous Receiver/Transmitter (USART), Universal Serial Bus (USB), Firewire, or other wired communication protocol. Examples of wireless communication circuits include receive radios, transmit radios, transceiver radios, or the like. The radios can include circuits that conform to a Bluetooth, Zigbee, Wireless Fidelity (WiFi), Long Term Evolution (LTE), Institute of Electrical and Electronics Engineers (IEEE) 802.11, or other wireless communication protocol.

The device 104 can acquire biometric data using the transducer 103. The transducer 103 converts variations in a physical characteristic that can be quantified into an electrical signal. For example, the physical characteristic can include one or more of pressure, color, brightness, temperature, chemical makeup (e.g., salinity, odor, oxygen, water, pH, or the like), contour, shape, resistivity or conductivity, a combination thereof, or the like. The transducer 103 can sometimes be called a sensor. Examples of transducers 103 include a pressure sensor, optical transducer, salinity, water, oxygen, or other chemical sensor, a thermometer, or the like.

The memory 105 can include data to be used in a registration or verification process (jointly called an authentication process). For example, the memory 105 can include one or more of: (i) an authentication server identity provided or generated based data provided in a server registration communication 110; (ii) a user identity provided or generated based data provided in a user registration communication 112; (iii) biometric data of the user 102, such as from the processing circuitry 101 or directly from the transducer 103, from a user registration communication 112; and (iv) an encryption or decryption key to be used in communicating with the authentication server 106; or other authentication data.

The authentication server 106 manages user 102 access to the device 104. The authentication server 106 can include processing circuitry 109 that facilitates authentication of the user 102 that attempts to access the device 104. The authentication server 106 can be a part of a dedicated computer (a computer dedicated to managing access to the device 104), a switch (e.g., an Ethernet switch), an access point, or a network access server, or other device. The processing circuitry 109 determines whether someone (or something) is what they declare they are. Techniques of such a determination are discussed elsewhere herein.

The processing circuitry 101, 109 can additionally, or alternatively, include one or more electrical or electronic components configured to form a circuit. The electrical or electronic components can include one or more resistors, transistors, capacitors, diodes, inductors, power supplies (e.g., voltage or current sources, such as a battery or power cord connected to a power source), regulators (voltage or current regulators), modulators, demodulators, analog to digital converter, digital to analog converter, a processor (e.g., a central processing unit (CPU), graphics processing unit (GPU), application specific integrated circuit (ASIC), field programmable gate array (FPGA)), logic gates (e.g., AND, OR, XOR, negate, or buffer gates), multiplexers, switches, radios (e.g., receive radio, transmit radio, or transceiver radio), communication ports (e.g., an Ethernet port, a USB port, Firewire port, UART port, USART port, or the like), or the like. The processing circuitry 101, 109 can be configured to execute instructions stored on a memory 105, 113, or other memory, that cause the processing circuitry 101, 109 to perform operations of the device 104 or the authentication server 106, respectively.

The authentication server 106 is illustrated as further including a memory 113. The memory 113 can include authentication data 107. The authentication data 107 can include data to be used in a user, device, or authentication server verification process, such as a handshake. The authentication data 107 can include a user identity or biometric data, such as can be provided or generated based on data provided in a user registration communication 114, of the user 102. The authentication data 107 can include a device identity, such as can be provided or generated based on data provided in a device registration communication 108. The authentication data can include an authentication server identity, such as can be provided or generated based on data provided in a server registration communication 110.

The device 104 can register with the authentication server 106 with a device registration communication 108. The device registration communication 108 can include authentication data to be used in an authentication process. The authentication data can include one or more characteristics of the device 104 that can be unique to the device 104 (e.g., in aggregate). The one or more characteristics can include one or more of a serial number, model number, device type, device version number, operating system, operating system version, device color, date of manufacture, media access control (MAC), a combination thereof, or the like. The authentication data can include non-device-based data that can be used for authentication. For example, the authentication data can include a certificate, cryptographic key, random number, other number, string of characters, a combination thereof, or the like. In some embodiments, the authentication data can include a combination of a characteristic and a non-device-based data.

The authentication server 106 can register with the device 104 with an authentication server registration communication 110. The device registration communication 108 can include authentication data to be used in the authentication process with the device 104. The authentication data from the server can include one or more characteristics of the authentication server 106 that can be unique to the authentication server 106 (e.g., in aggregate). The one or more characteristics of the authentication server 106 can include one or more of a a serial number, model number, device type, device version number, operating system, operating system version, device color, date of manufacture, media access control (MAC), a combination thereof, or the like. The authentication data can include non-device-based data that can be used for authentication. For example, the authentication data can include a certificate, cryptographic key, random number, other number, string of characters, a combination thereof, or the like. In some embodiments, the authentication data can include a combination of a characteristic and a non-device based data. The device registration communication 108 and server registration communication 110 serve to exchange data that can be used for the device 104 to authenticate with the server 106 and for the authentication server 106 to authenticate with the device 104.

The user 102 can optionally register with the device 104 with a user registration communication 112. The registration communication 112 can include a request to allow the user access to at least some of the functionality of the device 104. In some embodiments, the user registration communication 112 can include the user interacting directly with the device 104. In some other embodiments, the user registration communication 112 can be from a user interacting with a different device. In some embodiments, the user registration communication 112 can include one or more of a username, password, passcode, biometric data, or other data that is unique to the user 102 (unique from the perspective of the device 104). In some embodiments, the user registration communication 112 includes biometric data that can be gathered by the device 104 in the natural operation of the device 104.

The biometric data can include data gathered by the device 104 while the user is performing an operation that is not an authentication operation. Biometric data is data from body measurements. Biometric data relates to one or more physiological characteristics (versus behavioral characteristics) of the user 102. The biometric data can include facial characteristics, skin characteristics (e.g., color, such as under a specified illumination, texture, hair color, salinity, temperature, skin print, such as a fingerprint, or the like), vein or artery print, deoxyribose nucleic acid (DNA), wrist or palm print, geometry of a portion of the body, iris print, retina print, odor or scent, chemical composition, or other biometric data.

Examples of authentication operations include a user entering a password, username, passcode or the like through a user interface. Other examples of authentication operations include a user positioning a camera of the device 104 so that their face is in a field of view of the camera so that the device can verify their facial identification, or the user placing their finger on a specified location of the device 104 so that the device 104 can verify their fingerprint. These are not operations that are required for normal operation of the phone and requires the user 102 to perform an action beyond the operation of the phone they desire.

Examples of non-authentication operations include picking up the device 104 if the device 104 is a phone, reader, tablet, inventory management device, or other handheld device, putting down a visor of the device 104 if the device is a helmet, putting the device 104 on their wrist if the device 104 is a watch or fitness tracker, putting the device 104 on their chest, ankle, or wrist if the device 104 is a fitness tracker, opening a door of the device 104 if the device 104 is a refrigerator, microwave, oven, vehicle, or the like, grabbing a remote control of the device 104 if the device 104 is a television, drone, or other remotely controlled device, lifting a cover of the device 104 if the device 104 is a laptop, or the like.

The user 102 can register with the authentication server 106 with a user registration communication 114. The user registration communication 114 can include a request to associate the user access with the device 104. In some embodiments, the user registration communication 114 can include the user interacting directly with the device 104. In some other embodiments, the user registration communication 114 can be from a user interacting with a different device. In some embodiments, the user registration communication 114 can include one or more of a username, password, passcode, biometric data, or other data that can be used to uniquely identify the user 102. In some embodiments, the user registration communication 114 includes biometric data that can be gathered by the device 104 in the natural operation of the user 102 operating the device 104.

At operation 116, the authentication server 106 can associate the user 102 with the device 104. Associating the user 102 with the device 104 can include setting one or more bits in a memory accessible by the authentication server 106 to indicate that the user 102 has sufficient permissions to access at least some functionality of the device 104. The registration process ends at operation 116 and a verification process begins at operation 118 with the user 102 performing a non-authentication operation with the device 104. The separation between the registration and verification processes is indicated by dotted line 133. The non-authentication operation 118 is discussed previously regarding the user registration communication 112.

During performance of the non-authentication operation 118, the device 104 can collect biometric data of the user 102, at operation 120. The biometric data collected at operation 120 can include the data provided in the user registration communication 112, 114. The operation 120 allows the device 104 to perform user authentication without the user 102 being aware of the authentication. This is sometimes called "seamless" herein.

The device 104 can provide a device verification communication 122 to the authentication server 106. The device verification communication 122 can include device data, such as data provided in the device registration communication 108 or data derived from the data in the device registration communication 108. For example, the data in the device verification communication 122 can include data from the device registration communication 108 that is concatenated, combined by some mathematical technique, encrypted by an encryption key, such as can be derived from the data or shared with the authentication server 106, or the like.

The authentication server 106 can provide a server verification communication 124 to the device 104. The authentication server verification communication 124 can include authentication server data, such as data provided in the server registration communication 110 or data derived from the data in the server registration communication 110. For example, the data in the server verification communication 124 can include data from the server registration communication 110 that is concatenated, combined by some mathematical technique, encrypted by an encryption key, such as can be derived from the data or shared with the device 104, or the like.

The device verification communication 122 and the server verification communication 124 can sometimes be called a "two-way handshake". The communications 122, 124 serve to mutually verify the device 104 and the server 106 with each other. The two-way handshake can include encrypted communication of the device data or the server data. The two-way handshake can include derivation of an encryption or decryption key, such as can be based on data provided in the registration communication 108, 110.

The device 104 or the authentication server 106 can provide a result communication 126 indicating whether the two-way handshake was successful or failed. While the device verification communication 122, the server verification communication 124, and the result communication 126 are illustrated as occurring after the operations 118 and 120, some embodiments can include the device verification communication 122, the server verification communication 124, and the result communication 126 before the operation 118.

A user verification communication 128 can be provided from the device 104 to the server 106. The user verification communication 128 can include biometric data collected by the device 104. The biometric data can include the biometric data collected at the operation 120. The user verification communication 128 can be to verify whether the user 102 has sufficient permissions to access at least some functionality of the device 104.

The authentication server 106 can compare the biometric data from the user verification communication 128 to biometric data of user(s) in the authentication data 107. If the authentication data 107 includes biometric data that is sufficiently similar to the biometric data in the user verification communication 128 and the user 102 is associated with the device 104, such as at operation 116, authentication can succeed. In such an example, the authentication server 106 can indicate to the device 104, through a result communication 130 that the verification has succeeded. If either the biometric data is not sufficiently close to biometric data in the authentication data 107 or the device 104 is not associated with the user 102 in the authentication data 107, the authentication server 106 can indicate to the device 104, through the result communication 130 that the verification has failed. In such a case, the device 104 can refrain from allowing the user 102 access to the functionality thereof. In some embodiments, the device 104 can issue a result communication 132 to the user 102 indicating whether authentication succeeded or failed. The result communication 132 can be a visual, audio, vibration, haptic, or other signal that communicates whether the authentication succeeded or failed.

Figure 2:
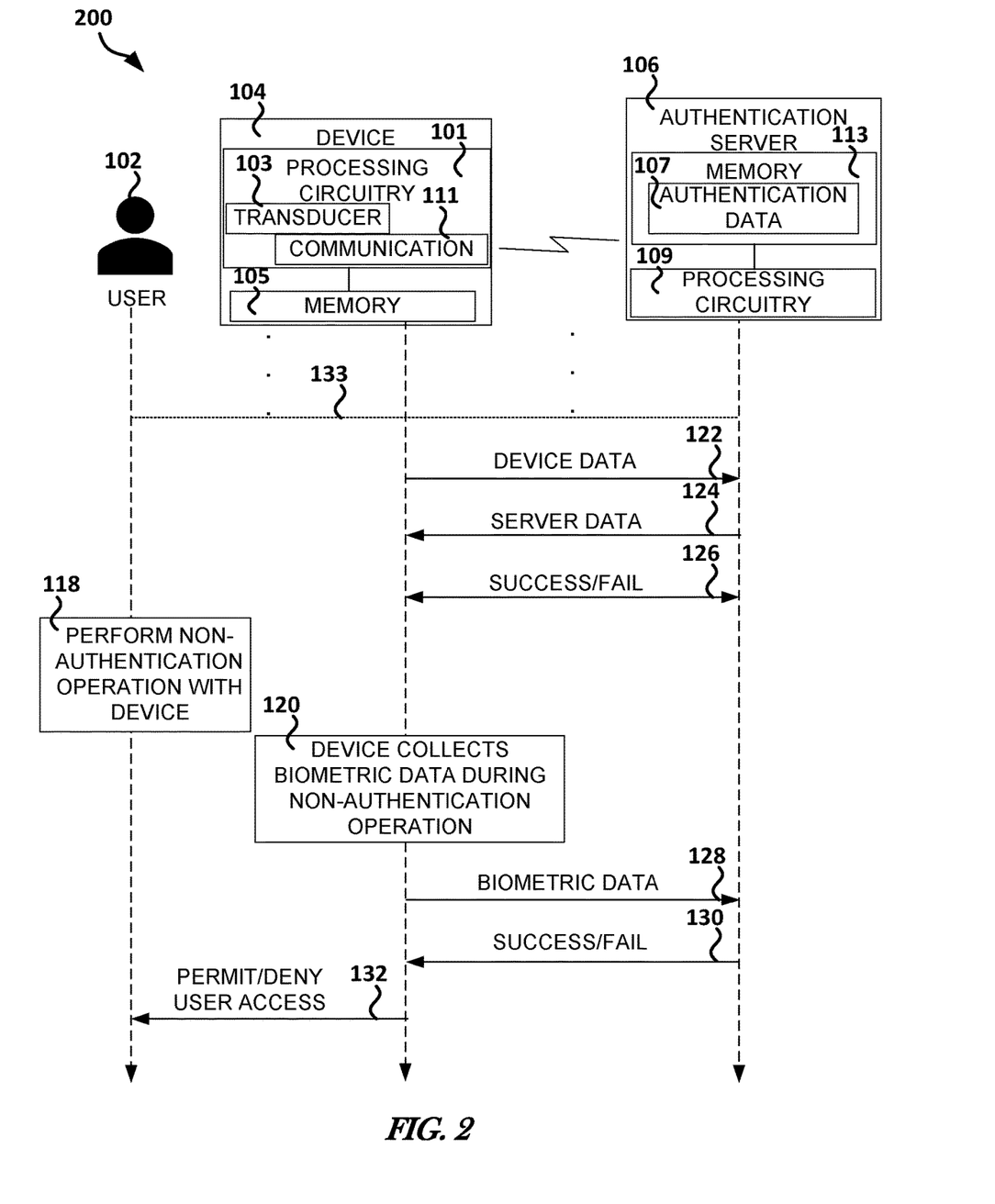
FIG. 2 illustrates, by way of example, a communication diagram of another embodiment of communications between items of a seamless authentication system.

FIG. 2 illustrates, by way of example, a communication diagram of another embodiment of other communications between items of a seamless authentication system 200. The system 200 includes the same items as the system 100. The difference between the systems 100 and 200 is that, in the system 200, the device 104 and the authentication server 106 perform a verification process handshake before the user performs the non-authentication operation with the device at operation 118. The registration process of the system 200 can be the same as for the system 100.

More specifically, the handshake that includes the device verification communication 122, the server verification communication 124 and the results communication 126 occurs before the operation 118. This allows the user 102 to operate the device 104 with less lag in functionality, at least because the user 102 does not have to wait for the handshake operations to pass after performing the operation 118.

As in the system 100, the device 104 can provide a device verification communication 122 to the authentication server 106. The device verification communication 122 can include device data, such as data provided in the device registration communication 108 or data derived from the data in the device registration communication 108. For example, the data in the device verification communication 122 can include data from the device registration communication 108 that is concatenated, combined by some mathematical technique, encrypted by an encryption key, such as can be derived from the data or shared with the authentication server 106, or the like.

The authentication server 106 can provide a server verification communication 124 to the device 104. The authentication server verification communication 124 can include authentication server data, such as data provided in the server registration communication 110 or data derived from the data in the server registration communication 110. For example, the data in the server verification communication 124 can include data from the server registration communication 110 that is concatenated, combined by some mathematical technique, encrypted by an encryption key, such as can be derived from the data or shared with the device 104, or the like.

The device verification communication 122 and the server verification communication 124 can sometimes be called a "two-way handshake". The communications 122, 124 serve to mutually verify the device 104 and the server 106 with each other. The two-way handshake can include encrypted communication of the device data or the server data. The two-way handshake can include derivation of an encryption or decryption key, such as can be based on data provided in the registration communication 108, 110.

The device 104 or the authentication server 106 can provide a result communication 126 indicating whether the two-way handshake was successful or failed. While the device verification communication 122, the server verification communication 124, and the result communication 126 are illustrated as occurring after the operations 118 and 120, some embodiments can include the device verification communication 122, the server verification communication 124, and the result communication 126 before the operation 118.

Similar to the system 100, during performance of the non-authentication operation 118, the device 104 can collect biometric data of the user 102, at operation 120. The biometric data collected at operation 120 can include the data provided in the user registration communication 112, 114. The operation 120 allows the device 104 to perform user authentication without the user 102 being aware of the authentication. This is sometimes called "seamless" herein.

A user verification communication 128 can be provided from the device 104 to the server 106. The user verification communication 128 can include biometric data collected by the device 104. The biometric data can include the biometric data collected at the operation 120. The user verification communication 128 can be to verify whether the user 102 has sufficient permissions to access at least some functionality of the device 104.

The authentication server 106 can compare the biometric data from the user verification communication 128 to biometric data of user(s) in the authentication data 107. If the authentication data 107 includes biometric data that is sufficiently similar to the biometric data in the user verification communication 128 and the user 102 is associated with the device 104, such as at operation 116, authentication can succeed. In such an example, the authentication server 106 can indicate to the device 104, through a result communication 130 that the verification has succeeded. If either the biometric data is not sufficiently close to biometric data in the authentication data 107 or the device 104 is not associated with the user 102 in the authentication data 107, the authentication server 106 can indicate to the device 104, through the result communication 130 that the verification has failed. In such a case, the device 104 can refrain from allowing the user 102 access to the functionality thereof. In some embodiments, the device 104 can issue a result communication 132 to the user 102 indicating whether authentication succeeded or failed. The result communication 132 can be a visual, audio, vibration, haptic, or other signal that communicates whether the authentication succeeded or failed.

Figure 3:
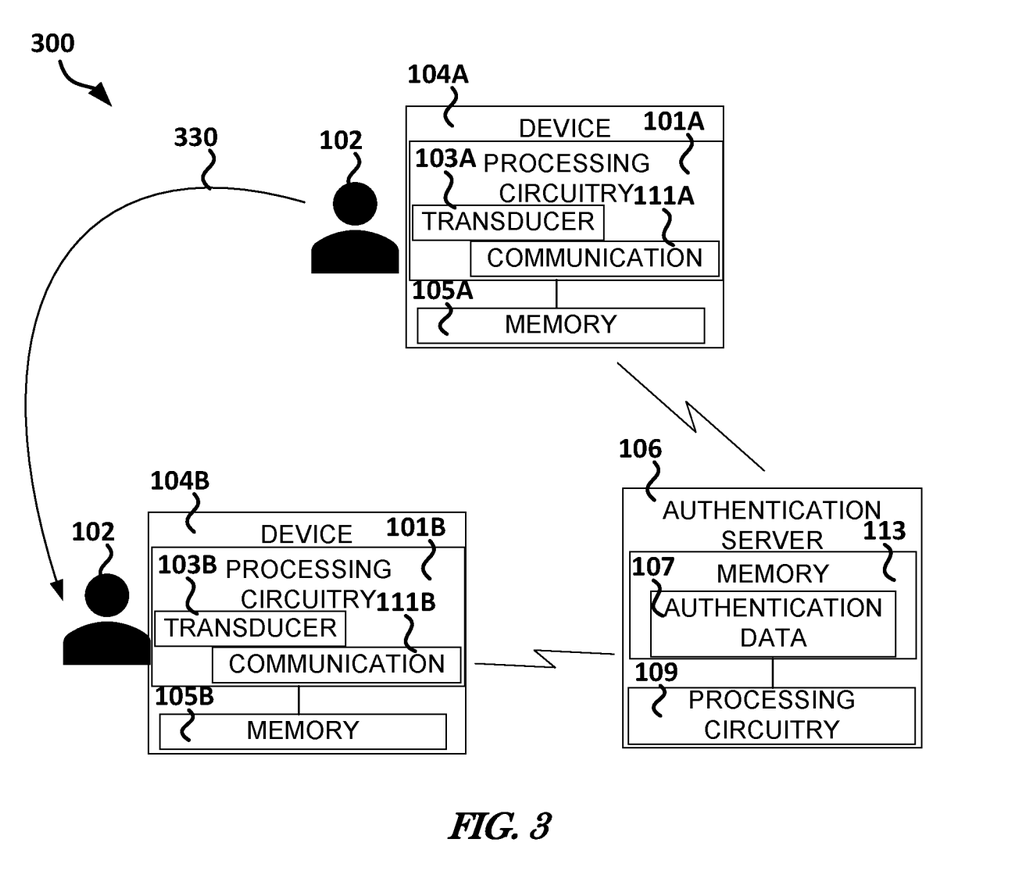
FIG. 3 illustrates, by way of example, a diagram of an embodiment of a system for indirect user, device, or server authentication and verification.

FIG. 3 illustrates, by way of example, a diagram of an embodiment of a system 300 for indirect user 102, device 104A, 104B, or authentication server 106 registration and verification. The device 104A, 104B illustrates specific instances of the device 104. The suffix means that the device 104A is different from the device 104B and that the components thereof are similar to the components of the same number that do not include a suffix.

Using the system 300, the user 102 can register with the authentication server 106, such as by causing the device 104A to issue a user registration communication, similar to the user registration communication 114. The registration communication 114 can serve to associate the user 102 with the device 104B in the authentication data 107. The user 102 can then use the device 104B. The device 104B can interact with the authentication server 106 to perform a registration or authentication process, such as discussed regarding FIGS. 1-2 and 4-5.

Figure 4:
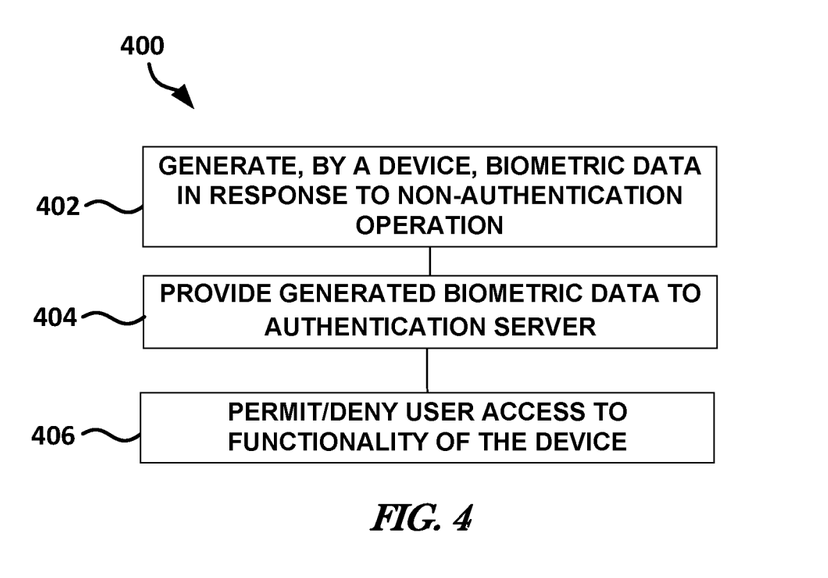
FIG. 4 illustrates, by way of example, a diagram of an embodiment of a method for seamless authentication.

FIG. 4 illustrates, by way of example, a diagram of an embodiment of a method 400 for seamless authentication. The method 400 as illustrated includes generating, by a device, biometric data in response to a non-authentication operation performed by a user using the device, at operation 402; providing generated biometric data to an authentication server, at operation 404; and permitting or denying the user access to the functionality of the device, at operation 406. The operation 402 can be performed by a transducer of the device. The non-authentication operation can include an operation performed by the user that is not for user verification with the device, such as the user picking up the device, placing the device on their wrist, or the like. The non-authentication operation can include an operation, such as those just mentioned, that occurs in the normal use of the device.

The method 400 can include, wherein the authentication server is registered with and verified by the device and the device is registered with and verified by the authentication server. The operation 406 can include permitting the user access to the functionality of the device and can occur in response to a results communication from the authentication server indicating the user verification passed. The operation 406 can include denying the user access to functionality of the device and can occur in response to the results communication from the authentication server indicating that the user verification failed. The results communication provided at operation 406 can indicate whether the biometric data matches biometric data of the authentication server and whether the user is associated with the device (in the authentication server).

The method 400 can further include providing a device registration communication to the authentication server to register the device with the authentication server, the device registration communication including data to be used in a two-way verification process. The method 400 can further include receiving an authentication server registration communication from the authentication server, the authentication server registration communication including authentication server data to be used in the two-way verification process. The two-way verification process can include verifying the authentication server data matches authentication server data in the memory.

The method 400 can further include associating an authentication server identification with an authentication server address. The authentication server identification can include or be derived from the authentication server data. The method can further include providing a user registration communication to the authentication server, the user registration communication including user registration data used to generate a unique user identification.

Figure 5:
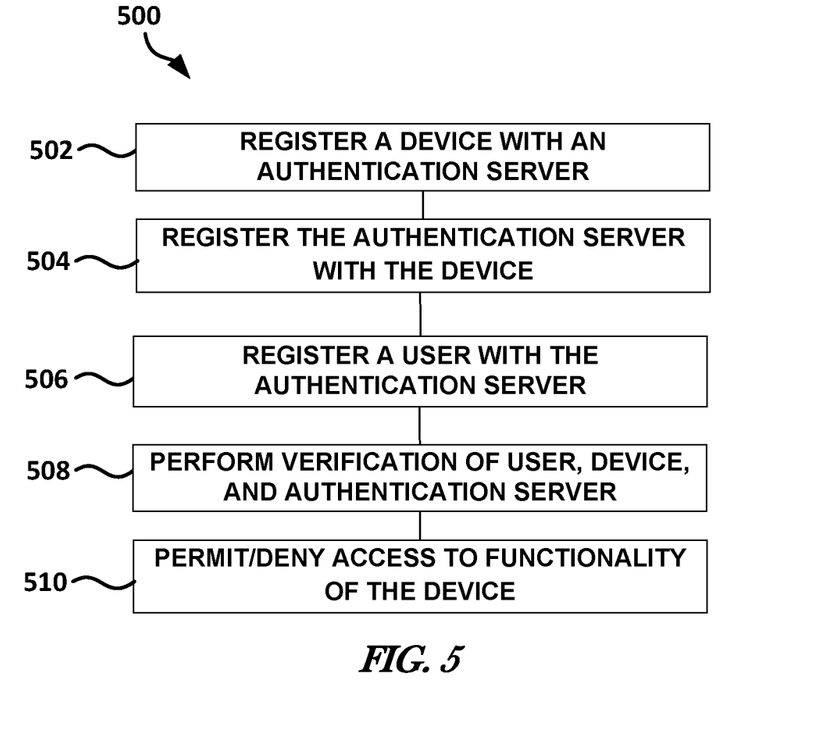
FIG. 5 illustrates, by way of example, a diagram of another embodiment of a method for seamless authentication.

FIG. 5 illustrates, by way of example, a diagram of an embodiment of a method 500 for seamless authentication. The method 500 as illustrated includes registering a device with an authentication server, at operation 502; registering the authentication server with the device, at operation 504; registering a user with the authentication server, at operation 506; performing verification of user, device, and authentication server, at operation 508; and permitting or denying access to functionality of the device (based on a result of the verification at operation 506), at operation 510. The operation 502 can include receiving or generating a device identification. The operation 504 can include receiving or generating an authentication server identification. The operation 506 can include receiving or generating a user identification.

The operation 508 can be performed in response to detecting, by the device, the user has performed a specified action using the device. The operation 508 can include verifying, by communication between the device and the authentication server, and at least two identities of (i) the device identification, (ii) the authentication server identification, (iii) the respective user identification, and (iv) that the respective user identification is associated with the device identification. The operation 510 can include, in response to any of the at least two identities failing to verify, denying user action to functionality of the device. The operation 510 can include, in response to all the at least two identities being verified, permitting the user access to the functionality of the device.

The operation 504 can include receiving, from the authentication server, a unique authentication server identification and associating the authentication server identification with an authentication server address. The operation 506 can include providing, by the device, biometric data of the user to authentication server. The biometric data can indicate facial characteristics, a wrist print, or a palm print of the user. The biometric data can be captured by the device. The biometric data can be captured by another device and provided to the authentication server. The specified action can include an operation with the device that is required to use the device to perform a non-authentication operation and the biometric data is captured in the process of performing the operation. The specified action can include closing a visor of the device, picking up the device, or situating the device on a wrist of the user.

Figure 6:
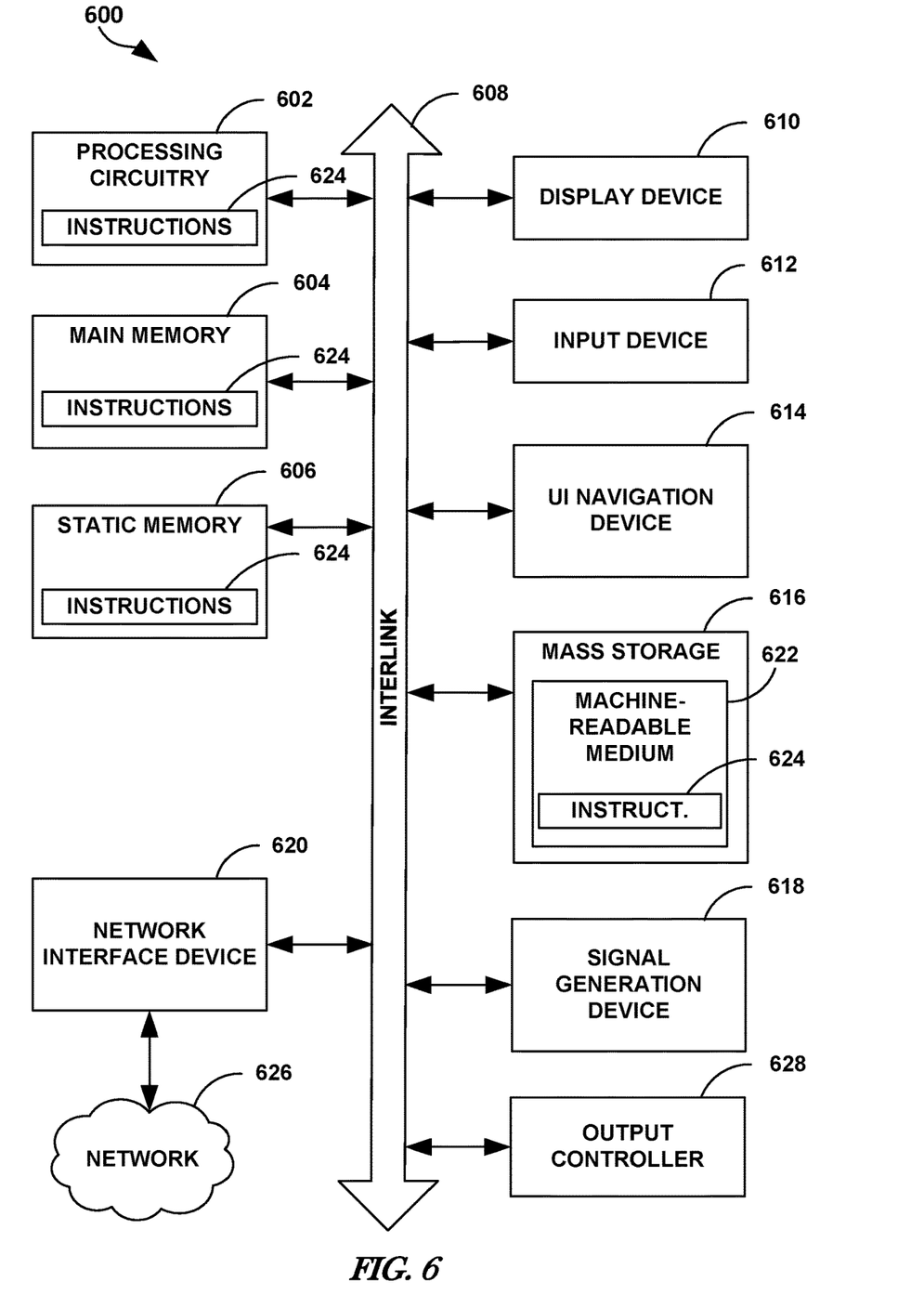
FIG. 6 illustrates, by way of example, a block diagram of an example of a device upon which any of one or more processes (e.g., methods) discussed herein can be performed.

FIG. 6 illustrates, by way of example, a block diagram of an example of a device 600 upon which any of one or more processes (e.g., methods) discussed herein can be performed. The device 600 (e.g., a machine) can operate to perform at least a portion of the techniques or methods discussed regarding FIGS. 1-5. In some embodiments, the device 104, 104A-104B, the authentication server 106, the processing circuitry 101, 103A-103B, 109, communication circuitry 111, 111A-111B can include one or more of the components of the device 600. In some examples, the device 600 can operate as a standalone device or can be connected (e.g., networked) to one or more components, such as the device 104A-104B or authentication server 106. The processing circuitry 101, 103A-103B or communication circuitry 111, 111A-111B can include one or more of the items of the device 600, or the device 600 can implement at least a part of a middleware, cloud, distributed, or other solution to performing one or more of the methods discussed herein.

Embodiments, as described herein, can include, or can operate on, logic or a few components, modules, or mechanisms. Modules are tangible entities (e.g., hardware) capable of performing specified operations when operating. A module includes hardware. In an example, the hardware can be specifically configured to carry out a specific operation (e.g., hardwired). In an example, the hardware can include configurable execution units (e.g., transistors, logic gates (e.g., combinational and/or state logic), or other circuitry, etc.) and a computer-readable medium containing instructions, where the instructions configure the execution units to carry out a specific operation when in operation. The configuring can occur under the direction of the executions units or a loading mechanism. Accordingly, the execution units can be communicatively coupled to the computer readable medium when the device is operating. In this example, the execution units can be a user of more than one module. For example, under operation, the execution units can be configured by a first set of instructions to implement a first module at one point in time and reconfigured by a second set of instructions to implement a second module.

Device (e.g., computer system) 600 can include a hardware processor 602 (e.g., a central processing unit (CPU), a graphics processing unit (GPU), a hardware processor core, processing circuitry (e.g., logic gates, multiplexer, state machine, a gate array, such as a programmable gate array, arithmetic logic unit (ALU), or the like), or any combination thereof), a main memory 604 and a static memory 606, some or all of which can communicate with each other via an interlink (e.g., bus) 608. The device 600 can further include a display unit 610, an input device 612 (e.g., an alphanumeric keyboard), and a user interface (UI) navigation device 614 (e.g., a mouse). In an example, the display unit 610, input device 612 and UI navigation device 614 can be a touch screen display. The device 600 can additionally include a storage device (e.g., drive unit) 616, a signal generation device 618 (e.g., a speaker), and a network interface device 620. The device 600 can include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 can include a machine-readable medium 622 on which is stored one or more sets of data structures or instructions 624 (e.g., software) embodying or utilized by any one or more of the techniques or functions described herein. The instructions 624 can also reside, completely or at least partially, within the main memory 604, within static memory 606, or within the hardware processor 602 during execution thereof by the device 600. In an example, one or any combination of the hardware processor 602, the main memory 604, the static memory 606, or the storage device 616 can constitute machine-readable media.

While the machine readable medium 622 is illustrated as a single medium, the term "machine readable medium" can include a single medium or multiple media (e.g., a centralized or distributed database, and/or associated caches and servers) configured to store the one or more instructions 624. The term "machine readable medium" can include any tangible medium that is capable of storing, encoding, or carrying instructions for execution by the device 600 and that cause the device 600 to perform any one or more of the techniques (e.g., processes) of the present disclosure, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks. A machine-readable medium does not include signals per se.

The instructions 624 can further be transmitted or received over a communications network 626 using a transmission medium via the network interface device 620 utilizing any one of several transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 can include one or more physical jacks (e.g., Ethernet, coaxial, or phone jacks) or one or more antennas to connect to the communications network 626. In an example, the network interface device 620 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the device 600, and includes digital or analog communications signals or other intangible medium to facilitate communication of such software.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present disclosure. Thus, although the present disclosure has been specifically disclosed by specific embodiments and optional features, modification and variation of the concepts herein disclosed may be resorted to by those of ordinary skill in the art, and that such modifications and variations are within the scope of embodiments of the present disclosure.

Additional Embodiments

The following exemplary embodiments are provided, the numbering of which is not to be construed as designating levels of importance:

Example 1 includes a device comprising a memory, processing circuitry, including a transducer to generate biometric data of a user of the device, coupled to the memory, the processing circuitry to perform operations comprising generating, by the transducer, biometric data of the user in response to detection of the user performing a non-authentication operation with the device, providing the biometric data to an authentication server for user verification, wherein the authentication server is registered with and verified by the device and the device is registered with and verified by the authentication server, permitting the user access to functionality of the device in response to a results communication from the authentication server indicating the user verification passed, and denying the user access to functionality of the device in response to the results communication from the authentication server indicating that the user verification failed.

In Example 2, Example 1 further includes, wherein the results communication indicates whether the biometric data matches biometric data of the authentication server and whether the user is associated with the device.

In Example 3, at least one of Examples 1-2 further include, wherein the operations further include providing a device registration communication to the authentication server to register the device with the authentication server, the device registration communication including data to be used in a two-way verification process.

In Example 4, Example 3 further includes, wherein the operations further include receiving an authentication server registration communication from the authentication server, the authentication server registration communication including authentication server data to be used in the two-way verification process.

In Example 5, Example 4 further includes, wherein the two-way verification process includes verifying the authentication server data matches authentication server data in the memory.

In Example 6, at least one of Examples 4-5 further includes, wherein the operations further include associating an authentication server identification with an authentication server address.

In Example 7, Example 6 further includes, wherein the authentication server identification includes or is derived from the authentication server data.

In Example 8, at least one of Examples 1-7 further includes, wherein the operations further include providing a user registration communication to the authentication server, the user registration communication including user registration data used to generate a unique user identification.

Example 9 includes a method performed through operation of the device of any of Examples 1-8.

Example 10 includes a machine-readable medium (e.g., a non-transitory machine-readable medium) including instructions that, when executed by a machine, cause the machine to perform operations of the method of Example 9.

Example 11, includes means for performing the method of Example 9.

Example 12 includes a method comprising registering a device with an authentication server including receiving or generating a device identification, registering the authentication server with the device including receiving or generating an authentication server identification and storing the authentication server identification in a memory of the device, registering a user with the authentication server including receiving or generating a user identification including the biometric data, in response to detecting, by the device, the user has performed a specified action using the device, verifying, by communication between the device and the authentication server, at least two identities of (i) the device identification, (ii) the authentication server identification, (iii) the respective user identification, and (iv) that the respective user identification is associated with the device identification, in response to any of the at least two identities failing to verify, denying user action to functionality of the device, and in response to all of the at least two identities being verified, permitting the user access to the functionality of the device.

In Example 13, Example 12 can further include, wherein registering the device with the authentication server includes receiving, from the authentication server, the unique authentication server identification and associating the authentication server identification with an authentication server address.

In Example 14, at least one of Examples 12-13 further includes, wherein registering the user with the authentication server includes providing, by the device, biometric data of the user to authentication server.

In Example 15, Example 14 further includes, wherein the biometric data indicates facial characteristics, a wrist print, or a palm print of the user.

In Example 16, at least one of Examples 14-15 further includes, wherein the biometric data is captured by the device.

In Example 17, at least one of Examples 14-16 further includes, wherein the biometric data is captured by another device and provided to the authentication server.

In Example 18, at least one of Examples 12-17 further includes, wherein the specified action includes an operation with the device that is required to use the device to perform a non-authentication operation and the biometric data is captured in the process of performing the operation.

In Example 19, Example 18 further includes, wherein the specified action includes closing a visor of the device, picking up the device, or situating the device on a wrist of the user.

Example 20 includes a device configured to perform the method of any of Examples 12-19.

Example 21 includes a machine-readable medium (e.g., a non-transitory machine-readable medium) including instructions that, when executed by a machine, cause the machine to perform operations of the method of at least one of Examples 12-20.

Example 22, includes means for performing the method of at least one of Examples 12-21.

Example 23 includes a non-transitory machine-readable medium including instructions that, when executed by a device, cause the device to perform operations comprising registering a device with an authentication server including receiving or generating a device identification, registering the authentication server with the device including receiving or generating an authentication server identification, registering one or more users with the authentication server including receiving or generating a user identification, verifying, by communication with the authentication server, each of (i) the device identification, (ii) the authentication server identification, (iii) the user identification, and (iv) that the respective user identification is associated with the device identification, in response to any of (i)-(iv) failing to verify, denying user action to functionality of the device, and in response to all of (i)-(iv) being verified, allowing the user access to the functionality of the device.

In Example 24, Example 23 further includes, wherein registering the device with the authentication server includes receiving, from the authentication server, the unique authentication server identification and associating the authentication server identification with an authentication server address.

In Example 25, at least one of Examples 23-24 further includes, wherein registering the user with the authentication server includes providing, by the device, biometric data of the user to authentication server.

In Example 26, Example 25 further includes, wherein the biometric data indicates facial characteristics, a wrist print, or a palm print of the user.

In Example 27, at least one of Examples 25-26 further includes, wherein the biometric data is captured by the device.

In Example 28, at least one of Example 25-27 further includes, wherein the biometric data is captured by another device and provided to the authentication server.

In Example 29, at least one of Examples 23-28 further includes, wherein the specified action includes an operation with the device that is required to use the device to perform a non-authentication operation and the biometric data is captured in the process of performing the operation.

In Example 30, Example 29 includes, wherein the specified action includes closing a visor of the device, picking up the device, or situating the device on a wrist of the user.

Example 31 includes a device configured to perform the operations of any of Examples 23-30.

Example 32 includes a method that includes performing the operations of at least one of Examples 23-30.

Example 33, includes means for performing the operations of at least one of Examples 23-30.

Example 34 includes a system comprising a device comprising a memory, device processing circuitry, including a transducer to generate biometric data of a user of the device, coupled to the memory, the device processing circuitry to perform first operations comprising generating, by the transducer, biometric data of the user in response to detection of the user performing a non-authentication operation with the device, providing the biometric data to an authentication server for user verification, wherein the authentication server is registered with and verified by the device and the device is registered with and verified by the authentication server, permitting the user access to functionality of the device in response to a results communication from the authentication server indicating the user verification passed, and denying the user access to functionality of the device in response to the results communication from the authentication server indicating that the user verification failed, the authentication server comprising a memory including authentication data stored thereon, authentication server processing circuitry to perform second operations comprising comparing the biometric data to second biometric data in the authentication data, and providing a results communication indicating that (i) the verification passes if (a) the biometric data matches the second biometric data and (b) that the user is associated with the device in the authentication data, or (ii) that the verification fails if either (c) the biometric data does not match the second biometric data or (d) the user is not associated with the device in the authentication data.

In Example 35, Example 34 further includes, wherein the first operations further include providing a device registration communication to the authentication server to register the device with the authentication server, the device registration communication including data to be used in a two-way verification process.

In Example 36, Example 35 further includes, wherein the first operations further include receiving an authentication server registration communication from the authentication server, the authentication server registration communication including authentication server data to be used in the two-way verification process.

In Example 37, Example 36 further includes, wherein the two-way verification process includes verifying the authentication server data matches authentication server data in the memory.

In Example 38, Example 37 further includes, wherein the first operations further include associating an authentication server identification with an authentication server address.

In Example 39, Example 38 further includes, wherein the authentication server identification includes or is derived from the authentication server data.

In Example 40, at least one of Examples 34-39 further includes, wherein the operations further include providing a user registration communication to the authentication server, the user registration communication including user registration data used to generate a unique user identification.

Example 41 includes at least one machine-readable medium (e.g., a non-transitory machine-readable medium) including instructions that, when executed by a machine, cause the machine to perform operations of a device of the system of at least one of Examples 34-39.

Example 42, includes means for performing operations of one or more of the devices of the system of at least one of Examples 34-39.

What is claimed is:

1. A device comprising:
 a memory;
 processing circuitry, including a transducer to generate biometric data of a user of the device, coupled to the memory, the processing circuitry being configured to:

register the device with an authentication server at least in part by receiving or generating a device identification;

register the authentication server with the device at least in part by receiving or generating an authentication server identification and storing the authentication server identification in the memory;

register a user with the authentication server including receiving or generating a user identification including the biometric data;

in response to a determination that the user has performed a specified action using the device, verifying, via communication between the device and the authentication server, at least two identities of (i) the device identification, (ii) the authentication server identification, (iii) the respective user identification, and (iv) that the respective user identification is associated with the device identification;

in response to any of the at least two identities failing failing verification, deny user action to functionality of the device; and in response to all of the at least two identities being verified, permit the user access to the functionality of the device.

2. The device of claim 1, wherein to register the device with the authentication server, the processing circuitry is configured to receive, from the authentication server, the unique authentication server identification and associating the authentication server identification with an authentication server address.

3. The device of claim 1, wherein to register the user with the authentication server, the processing circuitry is configured to provide biometric data of the user to the authentication server.

4. The device of claim 3, wherein the biometric data indicates one or more of facial characteristics, a wrist print, or a palm print of the user.

5. The device of claim 3, wherein the transducer is configured to capture the biometric data.

6. The device of claim 1, wherein the specified action includes an operation with the device that is required to use the device to perform a non-authentication operation and the biometric data is captured in the process of performing the operation.

7. The device of claim 6, wherein the specified action includes closing a visor of the device, picking up the device, or situating the device on a wrist of the user.

8. A method comprising:
registering a device with an authentication server including receiving or generating a device identification;
registering the authentication server with the device including receiving or generating an authentication server identification;
registering a user with the authentication server including receiving or generating a user identification;
in response to detecting, by the device, the user has performed a specified action using the device, verifying, by communication between the device and the authentication server, at least two identities of (i) the device identification, (ii) the authentication server identification, (iii) the respective user identification, and (iv) that the respective user identification is associated with the device identification; and
performing one of:
in response to any of the at least two identities failing to verify, denying user action to functionality of the device; or
in response to all of the at least two identities being verified, permitting the user access to the functionality of the device.

9. The method of claim 8, wherein registering the device with the authentication server includes receiving, from the authentication server, the unique authentication server identification and associating the authentication server identification with an authentication server address.

10. The method of claim 8, wherein registering the user with the authentication server includes providing, by the device, biometric data of the user to authentication server.

11. The method of claim 10, wherein the biometric data indicates facial characteristics, a wrist print, or a palm print of the user.

12. The method of claim 10, wherein the biometric data is captured by the device.

13. The method of claim 10, wherein the biometric data is captured by another device and provided to the authentication server.

14. The method of claim 8, wherein the specified action includes an operation with the device that is required to use the device to perform a non-authentication operation and the biometric data is captured in the process of performing the operation.

15. The method of claim 14, wherein the specified action includes at least one of closing a visor of the device, picking up the device, or situating the device on a wrist of the user.

* * * * *